United States Patent
Lamberti et al.

(10) Patent No.: US 11,027,254 B1
(45) Date of Patent: Jun. 8, 2021

(54) ADDITIVE MANUFACTURING OF MIXED-METAL PARTS USING SOL-GEL FEED MATERIALS

(71) Applicant: Consolidated Nuclear Security, LLC, Oak Ridge, TN (US)

(72) Inventors: Vincent E. Lamberti, Oak Ridge, TN (US); Roland D. Seals, Oak Ridge, TN (US); Patrick K. Moehlen, Knoxville, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 232 days.

(21) Appl. No.: 16/126,511

(22) Filed: Sep. 10, 2018

(51) Int. Cl.
| | |
|---|---|
| *B22F 9/18* | (2006.01) |
| *B22F 9/24* | (2006.01) |
| *B22F 9/30* | (2006.01) |
| *B33Y 10/00* | (2015.01) |
| *C22B 5/00* | (2006.01) |
| *D01F 9/08* | (2006.01) |
| *B01J 13/00* | (2006.01) |
| *B29C 64/118* | (2017.01) |
| *B29C 64/153* | (2017.01) |
| *B29C 64/364* | (2017.01) |
| *B29C 64/371* | (2017.01) |
| *B33Y 70/00* | (2020.01) |

(Continued)

(52) U.S. Cl.
CPC ....... *B01J 13/0039* (2013.01); *B01J 13/0043* (2013.01); *B01J 13/0047* (2013.01); *B22F 9/305* (2013.01); *B29C 64/118* (2017.08); *B29C 64/153* (2017.08); *B29C 64/364* (2017.08); *B29C 64/371* (2017.08); *B29K 2105/0061* (2013.01); *B33Y 30/00* (2014.12); *B33Y 70/00* (2014.12); *B33Y 70/10* (2020.01)

(58) Field of Classification Search
CPC ...... B22F 9/18; B22F 9/24; B22F 9/30; B22F 9/305; B29C 41/50; B29C 64/118; B29C 64/364; B29C 64/371; B29K 2105/0061; B33Y 10/00; B33Y 70/00; B33Y 70/10; C22B 5/00; D01F 9/08
USPC ........ 264/82, 83, 85, 308; 75/330, 351, 362, 75/392, 413
See application file for complete search history.

(56) References Cited

U.S. PATENT DOCUMENTS

| | | |
|---|---|---|
| 4,863,538 A | 9/1989 | Deckard |
| 5,745,834 A | 4/1998 | Bampton et al. |

(Continued)

FOREIGN PATENT DOCUMENTS

| | | |
|---|---|---|
| WO | 2016191162 A1 | 12/2016 |
| WO | 2016191534 A1 | 12/2016 |
| WO | 2017029673 A1 | 2/2017 |

OTHER PUBLICATIONS

Application Note: Viscosity measurement of Various Inkjet Inks, RheoSense, Inc., http://rheosense.com/pdf/ApplicationsArticles/APP-03_Ink-viscosity-measurment.pdf, Accessed Oct. 18, 2018.

(Continued)

*Primary Examiner* — Leo B Tentoni
(74) *Attorney, Agent, or Firm* — Luedeka Neely Group, P.C.; Michael J. Renner, Esq.

(57) ABSTRACT

Methods and systems for manufacturing a mixed-metal part by preparing a mixed-metal sol-gel as a feed material and using an additive manufacturing technique to form the mixed-metal part from the mixed-metal sol-gel feed material.

17 Claims, 1 Drawing Sheet

(51) Int. Cl.
  *B33Y 30/00*   (2015.01)
  *B29K 105/00*  (2006.01)
  *B33Y 70/10*   (2020.01)

(56) References Cited

U.S. PATENT DOCUMENTS

| | | | | |
|---|---|---|---|---|
| 6,129,872 | A * | 10/2000 | Jang | B29C 64/118 |
| | | | | 264/308 X |
| 2011/0151255 | A1* | 6/2011 | Kim, II | D01F 9/08 |
| | | | | 428/372 |
| 2012/0263619 | A1 | 10/2012 | Woodfield et al. | |
| 2014/0093778 | A1* | 4/2014 | Askit | C30B 29/22 |
| | | | | 429/231.3 |
| 2014/0232046 | A1 | 8/2014 | Fathallah et al. | |
| 2015/0056471 | A1* | 2/2015 | Joo | D01F 9/08 |
| | | | | 428/687 |
| 2020/0070242 | A1* | 3/2020 | Opschoor | B33Y 10/00 |

OTHER PUBLICATIONS

Brinker, C. J., et al., Spinnability of Silica Sols. J. Non-Cryst. Solids 1989, 111, 48-54.

Cooks, R. G., et al., Reactions of Ions with Organic Surfaces. Acc. Chem. Res. 1994, 27, 316-323.

Danks, A. E.; et al., The Evolution of 'Sol-Gel' Chemistry as a Technique for Materials Synthesis. Mater. Horiz. 2016, 3, 91-112.

Deheri, P. K., et al., Sol-Gel Based Chemical Synthesis of Nd2Fe14B Hard Magnetic Nanoparticles. Chem. Mater. 2010, 22, 6509-6517.

Duoss, Eric B., et al., Sol-Gel Inks for Direct-Write Assembly of Functional Oxides, Advanced Materials, 2007, vol. 19, pp. 3485-3489.

General Electric PowerPoint Slide, Slide 19, http://c.ymcdn.com/sites/www.vma.org/resource/resmgr/2015_Tech_Seminar_Presentations/Sears.pdf, Accessed Oct. 18, 2018.

Guglielmi, M., et al., Precursors for Sol-Gel Preparations. J. Non-Cryst. Solids 1988, 100, 16-30.

Heibel, M., et al., Use of Sol-Gel Chemistry for the Preparation of Cyanogels as Ceramic and Alloy Precursors. Chem. Mater. 1996, 8, 1504-1511.

Hench, L. L., et al., The Sol-Gel Process. Chem. Rev. 1990, 90, 33-72.

Improving additive manufacturing with air-free environments and inert gas management systems, Inert Corporation, https://www.inerttechnology.com/whats-new/improving-additive-manufacturing-air-free-environments-and-inert-gas-management-systems/, Accessed Oct. 18, 2018.

Jiang, Y., et al., Sol-Gel Autocombustion Synthesis of Metals and Metal Alloys. Angew. Chem. Int. Ed. 2009, 48, 8529-8531.

Kamiya, K., et al., Synthesis of SiO2 Glass Fibers from Si(OC2H5)4-H20-C2H50H-HCl Solutions Through Sol-Gel Method. J. Mat. Sci. 1986, 21, 842-848.

Kozuka, H., et al., Application of Sol-Gel Processing to Preparation of High Temperature Superconducting Materials. Bull. Inst. Chem. Res., Kyoto Univ. 1988, 66, 80-92.

Ma, X., et al., Preparation and Crystal Activation Energy of Long Yttrium Aluminum Garnet Gel Fibers. J. Sol-Gel Sci. Technol. 2016, 80, 226-232.

Maki, T., et al., Preparation of Alumina Fibers by Sol-Gel Method. J. Non-Cryst. Solids 1988, 100, 303-308.

Matsuzaki, K., et al., Continuous Silica Glass Fiber Produced by Sol-Gel Process. J. Non-Cryst. Solids 1989, 112, 437-441.

Sakka, S., Fibers from the Sol-Gel Process. In Sol-Gel Technology for Thin Films, Fibers, Preforms, Electronics, and Specialty Shapes; Klein, L. C., Ed.; Noyes Publications: Park Ridge, NJ, 1988; pp. 141-161.

Tan, H., et al., Preparation of Continuous Alumina Gel Fibres by Aqueous Sol-Gel Process. Bull. Mater. Sci. 2013, 36, 153-156.

Tirella, A., et al., The PAM2 System: A Multilevel Approach for Fabrication of Complex Three-Dimensional Microstructures. Rapid Prototyping J. 2012, 18, 299-307.

Vondrova M., et al., Autoreduction of Pd—Co and Pt—Co Cyanogels: Exploration of Cyanometalate Coordination Chemistry at Elevated Temperatures. J. Am. Chem. Soc. 2008, 130, 5563-5572.

Vondrova, M., et al., Cyanogel Coordination Polymers as Precursors to Transition Metal Alloys and Intermetallics—from Traditional Heating to Microwave Processing. Chem. Mater. 2007, 19, 2203-2212.

Vondrova, M., et al., Solid-State Chemistry in a Microwave Oven: Preparation of Pd/Co Alloy from Cyanogel Coordination Polymers. Chem. Mater. 2005, 17, 4755-4757.

Voxel 8 You Tube Channel videos, Voxel8, https://www.youtube.com/channel/UCE3e1dasvf5d5q6pmy8Pgbg, Accessed Oct. 18, 2018.

Yue., Y., et al., Fiber Spinnability of Glass Melts. Int. J. Appl. Glass Sci. 2016, 8, 37-47.

* cited by examiner

ADDITIVE MANUFACTURING OF MIXED-METAL PARTS USING SOL-GEL FEED MATERIALS

GOVERNMENT RIGHTS

The U.S. Government has rights to this invention pursuant to contract number DE-NA0001942 between the U.S. Department of Energy and Consolidated Nuclear Security, LLC.

FIELD

This disclosure relates to the field of fabricating mixed-metal parts. More particularly, this disclosure relates to using mixed-metal sol-gels as a feed material to additively manufacture mixed-metal parts in various chemical forms (e.g., oxides, alloys, or intermetallics) using various additive manufacturing techniques (e.g., fused deposition modeling and powder bed fusion).

BACKGROUND

The majority of alloyed-metal parts are produced by casting operations where a homogeneous molten charge is allowed to solidify within a mold patterned after the object to be manufactured. Alloys freeze through formation of needle-shaped crystals called dendrites that grow into the liquid. These dendrites usually develop secondary and tertiary arms, resulting in snowflake-like structures. During solidification, segregation of one or more of the minor alloy components (solutes) almost inevitably occurs because most solutes are less soluble in the solid phase than in the liquid phase. Thus, during solidification, the solutes are continually rejected by the new solid phase, creating concentration gradients that eventually are frozen into place. In many cases the segregation is extensive enough to produce visible banding in the final product.

There are two main types of segregation—microsegregation and macrosegregation. Microsegregation refers to localized differences in composition between dendrites and interdendritic liquid. Because the distances involved (~10-100 µm) are small enough for diffusion to be significant, microsegregation can be significantly ameliorated by subjecting the cast item to a heat treatment. On the other hand, macrosegregation refers to solute distributions over much larger scales, typically ranging from several millimeters to centimeters or even meters. Macrosegregation cannot be remedied or removed using heat treatments. Macrosegregation occurs because of relative motion of the solute-enriched and solute-depleted regions created by microsegregation, which, in turn, is caused by a number of complex drivers, including forced flows (stirring, purging, etc.), buoyancy-driven flows, and stress-induced deformations of the solid network.

What is needed therefore is a manufacturing technique for producing mixed-metal parts, including mixed-metal alloyed and intermetallic parts, that are substantially more free from segregation as compared to existing casting technologies. In addition, to make the part production process as efficient as possible, it is desired to produce parts that are near-net in shape to minimize post-production machining.

SUMMARY

In one embodiment, the present disclosure provides a method for manufacturing a mixed-metal part including (a) preparing a mixed-metal sol-gel having a viscosity between about 1 Pa·s to about 100 Pa·s; and (b) using an additive manufacturing technique to form the mixed-metal part from the mixed-metal sol-gel.

According to certain embodiments, step (b) includes forming the mixed-metal part in an inert atmosphere to form an alloyed or intermetallic part from the mixed-metal sol-gel.

According to certain embodiments, step (b) includes forming the mixed-metal part in a controlled environment that includes a reducing agent to form an alloyed or intermetallic part from the mixed-metal sol-gel. According to other embodiments, the mixed-metal sol-gel prepared in step (a) autoreduces to form an alloyed or intermetallic part during step (b).

According certain embodiments, step (b) comprises spreading the mixed-metal sol-gel on a build surface layer-by-layer and applying a heat source to the build surface in a desired pattern. According to some embodiments, the mixed-metal sol gel includes a viscosity between 1 Pa·s to about 10 Pa·s when spread on the build surface. According to some embodiments, the heat source includes an ion beam. In certain embodiments, the ion beam includes hydrogen, fluorine, chlorine, oxygen, or combinations thereof.

According to certain embodiments, the mixed metal sol-gel prepared in step (a) are sol-gel fibers and step (b) comprises feeding the sol-gel fibers through a heated nozzle to build the mixed-metal part layer-by-layer. According to some embodiments, the preparing step includes combining two or more different metal alkoxides to form the mixed-metal sol-gel and extruding the mixed-metal sol-gel into the sol-gel fibers.

According to another embodiment of the disclosure, a method for manufacturing a mixed-metal part includes (a) preparing a mixed-metal sol-gel by combining two or more different metal alkoxides to form the mixed-metal sol-gel; (b) extruding the mixed-metal sol gel into a plurality of mixed-metal sol-gel fibers; and (c) feeding the mixed-metal sol-gel fibers through a heated nozzle to build the mixed-metal part layer-by-layer.

According to certain embodiments, the mixed-metal sol-gel fibers have a viscosity between about 1 Pa·s to about 100 Pa·s.

According to certain embodiments, the mixed-metal part is formed in an inert atmosphere to form an alloyed or intermetallic part from the mixed-metal sol-gel fibers. According to other embodiments, step (c) includes forming the mixed-metal part in a controlled environment that includes a reducing agent to form an alloyed or intermetallic part from the mixed-metal sol-gel fibers. According to other embodiments, the mixed-metal part is formed in an oxidizing environment to form an oxidized part from the mixed-metal sol-gel fibers.

According to yet another embodiment of the disclosure, a method for manufacturing a mixed-metal part includes (a) preparing a mixed-metal sol-gel having a viscosity between about 1 Pa·s to about 10 Pa·s; and (b) spreading the mixed-metal sol-gel on a build surface layer-by-layer and applying a heat source to the build surface in a desired pattern to form the mixed-metal part.

According to certain embodiments, the heat source includes an ion beam. According to some embodiments, the ion beam includes hydrogen, fluorine, chlorine, oxygen, or combinations thereof.

According to certain embodiments, the build surface is disposed in an inert atmosphere to form an alloyed or intermetallic part from the mixed-metal sol-gel.

According to certain embodiments, step (b) includes forming the mixed-metal part in a controlled environment that includes a reducing agent to form an alloyed or intermetallic part from the mixed-metal sol-gel.

According to certain embodiments, the build surface is disposed in an oxidizing environment to form an oxidized part from the mixed-metal sol-gel.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
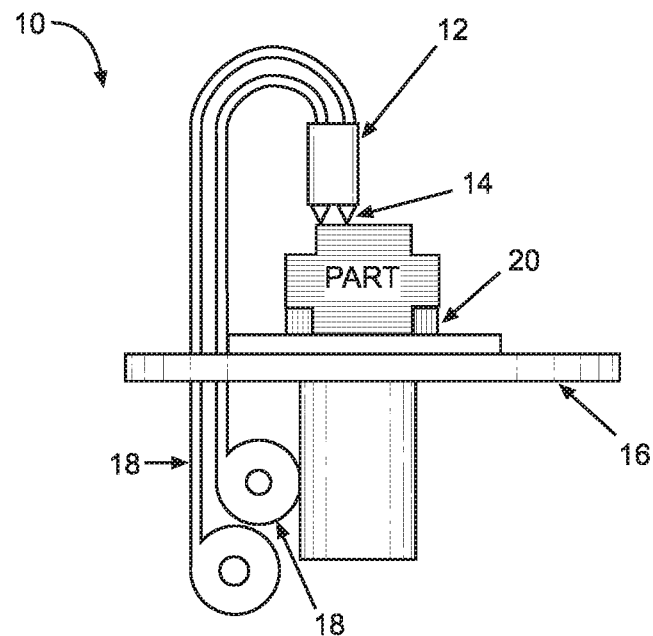
FIG. 1 is a schematic of an exemplary fused deposition modeling system according to one embodiment of the disclosure.

Classical sol-gel processing is a collection of low-temperature synthetic techniques that transform starting materials (i.e., reactants) first into a sol-gel and then into solid form (e.g., fibers, coatings, etc.). For purposes of the present disclosure, a "sol-gel" refers to a material formed by a set of reactants that are combined in a liquid medium and are induced to form a suspension of colloidal particles in a solvent ("sol") that ultimately evolves into a non-fluid 3-D network ("gel"). Reactants can include metal alkoxides, metal ion-chelate complexes, and organic polymers containing metal species. For purposes of the present disclosure, a "mixed-metal sol-gel" refers to a sol-gel formed from two or more metal-containing reactants and is typically used to produce a mixed-metal oxide. The viscosity of the gel can be governed through controlled removal of the solvent, and gels of various rigidities can be manufactured into powders, coatings, fibers, and monoliths as known in the art. Heat treatment of the gel produces a homogenous solid.

For example, in the sol-gel synthesis of silica fibers, a silicon alkoxide (tetraethyl orthosilicate or TEOS) is reacted with water under acidic conditions to produce a silanol:

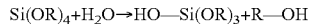

where R=$C_2H_5$. A silanol molecule then can react with another silanol molecule or an alkoxide molecule to produce a siloxane:

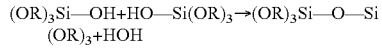

OR

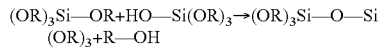

Continued polymerization in this manner at 20-80° C. yields a 3-D gel, which can be drawn into a silicon metal sol-gel fiber at room temperature. Heating the gel fiber at 400-800° C. produces a silica fiber. Formation of zirconia, titania, and alumina fibers can be produced using similar sol-gel synthesis techniques as described in the article entitled "Fibers from the Sol-Gel Process" by S. Sakka (Sol-Gel Technology for Thin Films, Fibers, Preforms, Electronics, and Specialty Shapes, 1988, 141-161). Similarly, fibers containing two or more different metal alkoxides can be used to produce a mixed-metal sol-gel that can be extruded into a mixed-metal sol-gel fiber (e.g., $(OR)_3M_1$-OH+HO-$M_2(OR)_3$ can be used to produce $(OR)_3M_1$-O-$M_2(OR)_3$ where $M_1$ and $M_2$ are different metals).

Alkoxides based on a number of other metals are available, including $Ti_4(OC_2H_5)_{16}$, $Zr_4(OC_2H_5)_{16}$, $Nb_2(OC_2H_5)_{10}$, $Ta_2(OC_2H_5)_{10}$, etc. Gels created from mixed alkoxides, as well as from other starting materials containing multiple metals, can readily be calcined into mixed-metal oxides. The sol-gel route to these products can avoid some of the major disadvantages of the conventional solid-state method such as repeated cycles of grinding and calcining mixtures of monometallic oxides, elevated temperatures being needed for an appreciable rate of reaction (often as high as 1000-1500° C.), and the procedure resulting in an incomplete reaction or inhomogeneous products. For example, an article entitled "Application of Sol-Gel Processing to Preparation of High Temperature Superconducting Materials" by Kozuka et al. (Bull. Inst. Chem. Res., Kyoto Univ., 1988, 66, 80-92), describes preparation of fibers and coatings of the high-temperature superconductor $YBa_2Cu_3O_{7-\delta}$ through sol-gel methods at lower temperatures than used in solid-state synthesis.

Mixed-metal oxides produced by sol-gel techniques can be reduced to alloyed metals or intermetallic compounds using a variety of external agents. For example, as taught in the article entitled "Sol-Gel Based Chemical Synthesis of $Nd_2Fe_{14}B$ Hard Magnetic Nanoparticles" by Deheri et al. (Chem. Mater., 2010, 22, 6509-6517), a Nd—Fe—B gel was prepared from a mixture of $NdCl_3$-$6H_2O$, $FeCl_3$-6H2O, $H_3BO_3$, citric acid, and ethylene glycol, and the Nd—Fe—B gel was reduced to $Nd_2Fe_{14}B$ hard magnetic nanoparticles using calcium hydride ($CaH_2$) at 800° C. as a reducing agent. Other reducing agents may include compounds such as lithium hydride (LiH), sodium hydride (NaH), lithium aluminum hydride ($LiAlH_4$), sodium borohydride ($NaBH_4$), and uranium hydride ($UH_3$). In addition, certain gels can be induced to undergo auto-reduction, i.e., where the reducing agent is internal. For example, as taught in an article entitled "Sol-Gel Autocombustion Synthesis of Metals and Metal Alloys" by Jiang et al., (Angew. Chem. Int. Ed. 2009, 48, 8529-8531), $Co_xNi_{1-x}$ (x=0.2, 0.4, 0.5, 0.6) alloys, as well as a number of pure metals (Co, Ni, Cu, Ag, Bi), may be obtained in a tube furnace at 300° C. from gels derived from metal nitrates, citric acid, and ammonia. More specifically, an aqueous solution of the metal nitrates and citric acid was prepared and the pH level of the solution was adjusted to appropriate levels with ammonia. A reaction pathway is believed to occur in which metal oxides are first generated through decomposition of the nitrates, and the oxides then are reduced by $CH_4$ and $H_2$ produced through decomposition of the $CH_x$ groups of the citric acid. As taught in a series of articles by M. Vondrova et al. ("Solid-State Chemistry in a Microwave Oven: Preparation of Pd/Co Alloy from Cyanogel Coordination Polymers," Chem. Mater. 2005, 17, 4755-4757) ("Cyanogel Coordination Polymers as Precursors to Transition Metal Alloys and Intermetallics—From Traditional Heating to Microwave Process," Chem. Mater. 2007, 19, 2203-2212) ("Autoreduction of Pd—Co and Pt—Co Cyanogels: Exploration of Cyanometalate Coordination Chemistry at Elevated Temperatures," J. Am. Chem. Soc., 2008, 130, 5563-5572), an extensive series of transition metal alloys (Pd/Co, Pt/Co, Ru/Co, Ir/Co, Pd/Ni, Pt/Ni, Pt/Ru, Pd/Fe, Pd/Fe/Co) and intermetallics ($Pt_3Fe$, $Pt_3Co$, PtCo) may be prepared through autoreduction of cyanogels created via reactions of tetrachlorometalates (e.g., $Na_2PdCl_4$) with transition metal cyanometalates (e.g., $K_3Co(CN)_6$). The reductions were done by the cyanide ligand in the temperature range 400-650° C. and the reactions were initiated using either thermal or microwave energy, with the processing time significantly reduced in the latter case.

According to the present disclosure, sol-gels as described above, and more particularly mixed-metal sol-gels, are made useful as feed or bed materials ("feed" and "bed" materials hereinafter collectively referred to as a "feed material") in additive manufacturing techniques by controlling the form and viscosity of the mixed-metal sol-gels. For example, according to one embodiment of the present disclosure, sol-gel in the form of extruded fibers preferably having a viscosity between about 1 Pa·s to about 100 Pa·s. may be used as the filament feed material in a fused deposition modeling ("FDM") system. Referring to FIG. 1, a conventional FDM system 10 is shown that includes a heated deposition head 12 having extrusion nozzles 14 that moves horizontally along the x and y axes and a build platform 16 that moves vertically along the z axis. The extruded sol-gel fibers 18 are unwound from one or more coils and drawn through the extrusion nozzles 14 of the heated deposition head 12 and deposited layer-by-layer on the build platform 16 to form a desired part 20. As each layer of the mixed-metal sol-gel cools, the layer immediately binds to the layer beneath it. Once a layer is completed, the build platform 16 is lowered and then the next layer is deposited. As shown in FIG. 1, FDM system 10 may have multiple spools of extruded sol-gel fibers 18 of differing materials. In other embodiments, only one spool is used.

Figure 2:
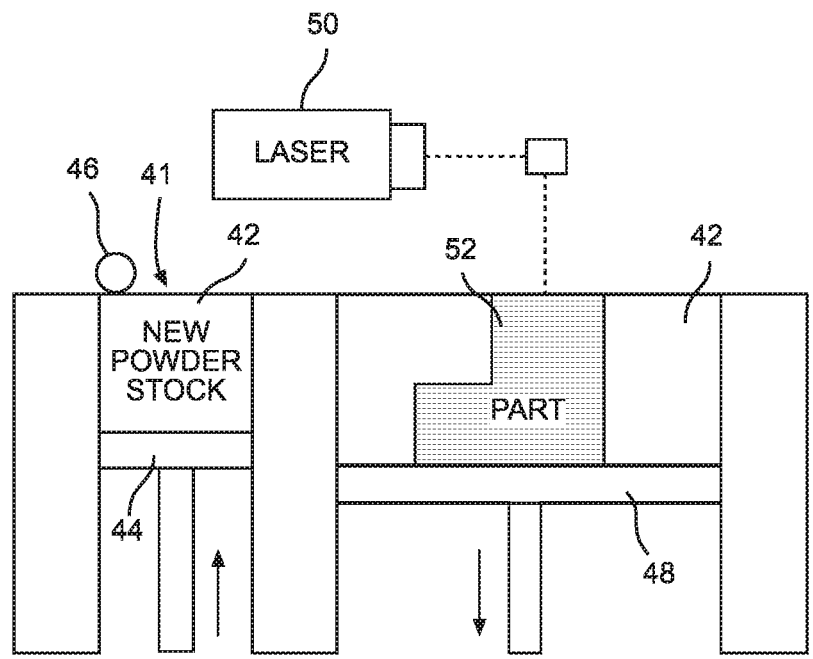
FIG. 2 is a schematic of an exemplary powder bed fusion system according to one embodiment of the disclosure.

According to another embodiment of the present disclosure, a mixed-metal sol-gel preferably having a viscosity of between about 1 Pa·s to about 10 Pa·s. serves as the feed material in a powder bed fusion type system. In other words, instead of the feed material being in powder form like traditional powder bed fusion systems, the feed material is in the form of a mixed-metal sol-gel typically having a lower viscosity as compared to the fiber form of the mixed-metal sol-gel used in the FDM embodiment of FIG. 1. Referring to FIG. 2, a powder bed fusion type system 40 is shown having a reservoir 41 of mixed-metal sol-gel feed material 42 disposed on a feed bed 44 that is movable vertically to supply the feed material 42 to a feed spreader 46 such as a roller, blade, wiper, etc. Disposed adjacent to the feed bed 44 is a build platform 48 that is also movable vertically. In operation, the feed spreader 46 initially spreads the sol-gel feed material 42 over the build platform 48. An object is "drawn" on the sol-gel feed material 42 deposited on the build platform through selective melting and bonding of the sol gel feed material 42 by a focused heat source 50 (such as a laser, electron or ion beam, etc.) according to a desired pattern. A desired part 52 is formed by repeatedly spreading the sol-gel feed material over the build platform and selectively melting/bonding the feed material 42 layer-by-layer while the build platform 48 is lowered after each layer. At the end of the process, the unprocessed feed material 42 left on the build platform 48 is removed from the desired part 52. In this regard, the viscosity of the sol-gel feed material 42 must be sufficient to prevent the unprocessed feed material from "running" away from the part 52 as it is being produced while also being fluid enough to distribute the feed material 42 over the build platform 48 and previous layers of the part 52.

In preferred embodiments, the heat source 50 for the powder bed fusion system 40 is or otherwise includes an ion beam such as hydrogen, fluorine, chlorine, or oxygen beams. The ion beam is selected as a volatile decomposition source to remove unwanted materials as the mixed metal part is being heated and formed. In other words, the ion beam is selected to be chemically reactive to certain organic components of the particular feed material to remove unwanted remnants of the sol-gel during part fabrication. In most preferred embodiments, the ion beam is a hydrogen beam, fluorine beam, or other type of molecular ion beam containing hydrogen and/or fluorine.

According to another aspect of the disclosure, alloyed or intermetallic parts may be produced by "printing" the mixed-metal sol-gels in an inert or reducing atmosphere while part is being formed. In the fused deposition modeling or powder bed fusion examples described above, the respective build platforms may be disposed in a controlled-environment having an inert atmosphere or an atmosphere containing a reducing agent such as hydrogen ($H_2$) or carbon monoxide (CO) gas. Other potential reducing agents include, but are not limited to, $CaH_2$, LiH, NaH, $LiAlH_4$, $NaBH_4$, $UH_3$, and combinations thereof. Similarly, mixed-metal sol-gels susceptible to autoreduction as described above may be reduced to alloyed or intermetallic parts during the printing process. In the latter application where the mixed-metal sol-gels are susceptible to autoreduction, the mixed-metal sol-gels offer the additional advantages of lower process temperatures and costs than classical metallurgical techniques.

In contrast, when oxidized parts are desired as compared to alloyed or intermetallic parts, the mixed-metal sol-gels may be subjected to an oxidizing environment while the part is being printed.

One critical advantage of using mixed-metal sol-gels as the feed material in additive manufacturing techniques is the homogenous nature of a sol-gel (i.e., the plurality of metals are chemically bonded together and uniformly distributed within the gel). As a result, segregation (both micro- and macrosegregation) of the metals in the final part should be significantly reduced without requiring additional heat treatments when the sol-gel is fed layer-by-layer into an additive manufacturing machine while being heated as compared to conventional casting techniques.

All references mentioned in the foregoing description have been presented for purposes of illustration and exposition as they relate to sol-gel materials in general. Each of these references are hereby incorporated by reference in their entirities.

The foregoing descriptions of embodiments of the disclosure have been presented for purposes of illustration and exposition. They are not intended to be exhaustive or to limit the disclosed embodiments to the precise forms disclosed. Obvious modifications or variations are possible in light of the above teachings. The embodiments are chosen and described in an effort to provide the best illustrations of the principles of the disclosed embodiments and its practical application, and to thereby enable one of ordinary skill in the art to utilize the various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method for manufacturing a mixed-metal part comprising:
    (a) preparing a feed material, the preparing step including:
    combining in a solvent a first metal containing reactant with a second metal containing reactant to form a mixed-metal sol-gel, and controllably removing a portion of the solvent from the mixed-metal sol-gel until the mixed-metal sol-gel achieves a desired viscosity to form the feed material; and (b) using an additive manufacturing technique to form the mixed-metal part from the feed material.

2. The method of claim 1 wherein step (b) comprises forming the mixed-metal part in an inert atmosphere to form an alloyed or intermetallic part from the feed material.

3. The method of claim 1 wherein step (b) comprises forming the mixed-metal part in a controlled environment that includes a reducing agent to form an alloyed or intermetallic part from the feed material.

4. The method of claim 1 wherein the feed material prepared in step (a) autoreduces to form an alloyed or intermetallic part during step (b).

5. The method of claim 1 wherein step (b) comprises spreading the feed material on a build surface layer-by-layer and applying a heat source to the build surface in a desired pattern.

6. The method of claim 5 wherein the desired viscosity is between 1 Pa·s to about 10 Pa·s.

7. The method of claim 5 wherein the heat source includes an ion beam.

8. The method of claim 7 wherein the ion beam includes hydrogen, fluorine, chlorine, oxygen, or combinations thereof.

9. The method of claim 7 wherein the ion beam includes hydrogen, fluorine, or combinations thereof.

10. The method of claim 1 wherein the feed material prepared in step (a) comprise sol-gel fibers and step (b) comprises feeding the sol-gel fibers through a heated nozzle to build the mixed-metal part layer-by-layer.

11. The method of claim 10 wherein the first metal containing reactant and the second metal containing reactant include two or more different metal alkoxides to form the mixed-metal sol-gel and the preparing step further includes extruding the mixed-metal sol-gel into the sol-gel fibers.

12. A method for manufacturing a mixed-metal part comprising:

(a) preparing a mixed-metal sol-gel by combining in a solvent a first metal alkoxide reactant with a second metal alkoxide reactant to form the mixed-metal sol-gel and controllably removing a portion of the solvent from the mixed-metal sol-gel until the mixed-metal sol-gel achieves a desired viscosity;

(b) extruding the mixed-metal sol gel into a plurality of mixed-metal sol-gel fibers; and (c) feeding the mixed-metal sol-gel fibers through a heated nozzle to build the mixed-metal part layer-by-layer.

13. The method of claim 12 wherein the desired viscosity is between about 1 Pa·s to about 100 Pa·s.

14. The method of claim 12 wherein the mixed-metal part is formed in an inert atmosphere to form an alloyed or intermetallic part from the mixed-metal sol-gel fibers.

15. The method of claim 12 wherein step (c) includes forming the mixed-metal part in a controlled environment that includes a reducing agent to form an alloyed or intermetallic part from the mixed-metal sol-gel fibers.

16. The method of claim 12 wherein step (c) includes forming the mixed-metal part in an oxidizing environment to form an oxidized part from the mixed-metal sol-gel fibers.

17. The method of claim 1 wherein the desired viscosity is between about 1 Pa·s to about 100 Pa·s.

\* \* \* \* \*